Oct. 23, 1934.  H. SYNCK  1,977,810
CORN HUSKING MECHANISM
Filed Oct. 26, 1931  2 Sheets-Sheet 1
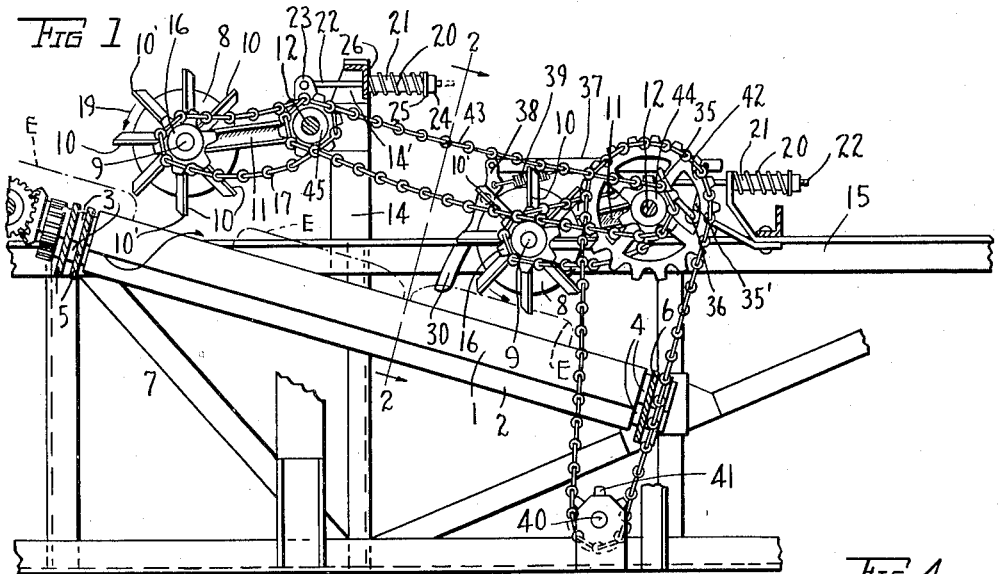
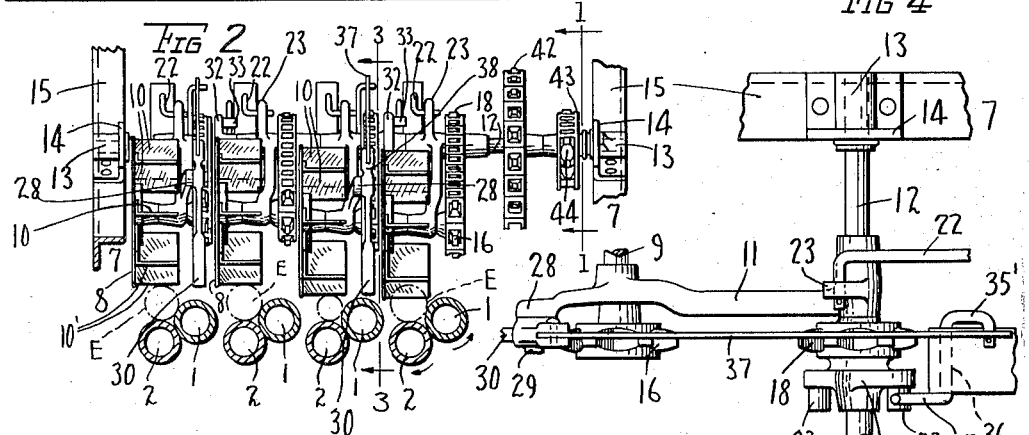
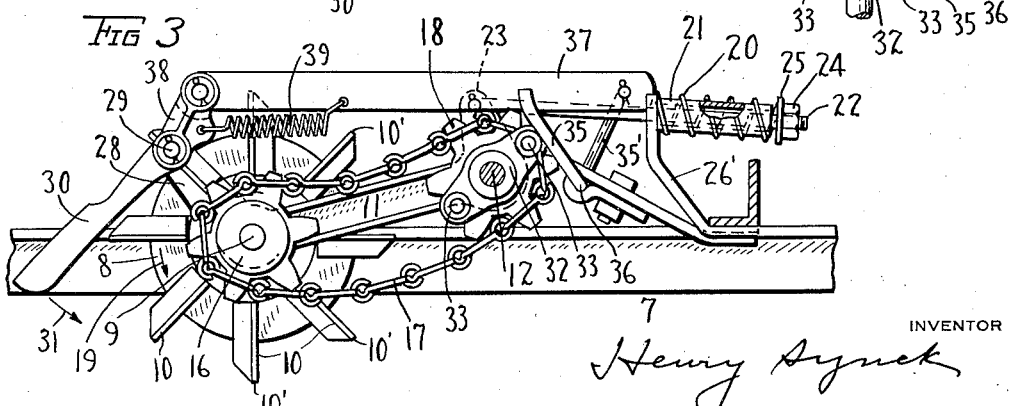
INVENTOR
Henry Synck
BY
Staley & Welch
ATTORNEYS

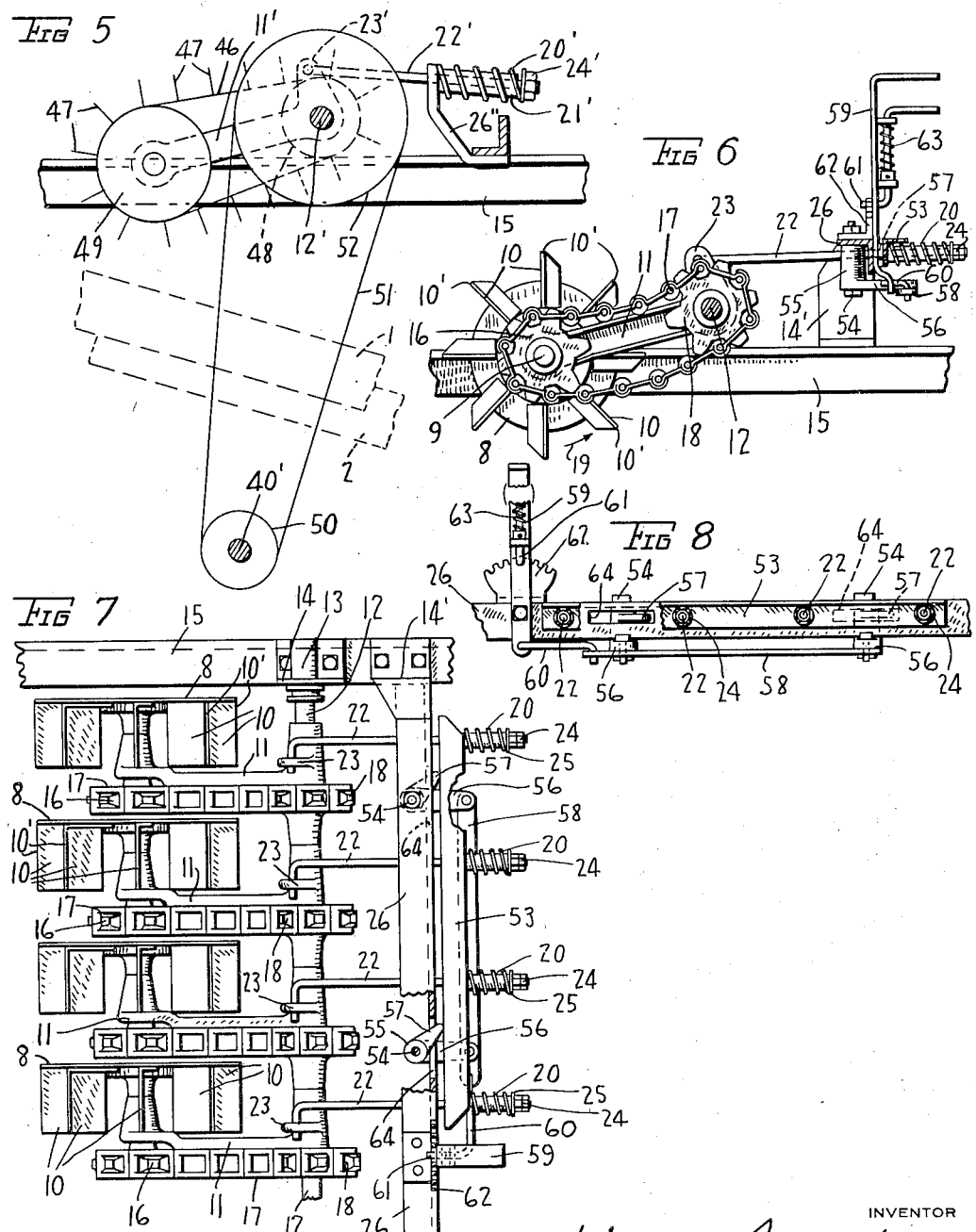

Patented Oct. 23, 1934

1,977,810

UNITED STATES PATENT OFFICE 1,977,810

CORN HUSKING MECHANISM

Henry Synck, Coldwater, Ohio, assignor to The New Idea Spreader Company, Coldwater, Ohio, a corporation of Ohio Application October 26, 1931, Serial No. 571,077

5 Claims. (Cl. 130—5)

This invention relates to improvements in corn husking devices, it more particularly relating to improved means for applying pressure to and evenly distributing the ears while the ears are being acted upon by the husking rolls.

One of the objects of the invention is the provision of simple and effective means for applying pressure to the ears of corn resting on the husking rolls whereby the husking operation is greatly facilitated.

Another object is to provide a uniform distribution of the ears over the upper husking roll surface and to provide for a uniform movement of the ears toward the point of discharge for the husked ears.

Other objects of the invention will appear from the accompanying description and statement of advantages.

In the accompanying drawings:

Fig. 1 is an elevation, partly in section parallel to the axes of the husking rolls, showing so much of the husking compartment of a picker as is needed to illustrate the manner of employing the invention. The section is taken on the line 1—1 of Fig. 2.

Fig. 2 is a transverse section on the line 2—2 of Fig. 1.

Fig. 3 is an enlargement of a portion of the view shown in Fig. 1.

Fig. 4 is an enlarged top plan view of a portion of the devices shown in elevation in Fig. 3.

Fig. 5 is a side elevation somewhat diagrammatic in character of a modification.

Fig. 6 is a side elevation of a portion of the device shown in Fig. 1 illustrating means for holding the presser wheel in elevated position.

Fig. 7 is a top plan view of the same.

Fig. 8 is a rear view of a portion of the same.

Referring to the drawings, 1 and 2 are the individual rolls of a pair of inclined husking rolls. A plurality of such pairs are commonly employed, rotatably supported in suitable bearings 3 and 4 fixed in transverse bars 5 and 6 which are parts of the main frame indicated in general at 7.

In the inclined husking roll chute (not shown) the ears are arranged in rows, end to end, and from this chute the ears slide by gravity to the upper ends of the husking rolls.

The ears then gravitate toward the discharge end of the rolls, during which time the husks are removed in the usual manner. It is preferable to apply pressure to the ears during a part of the time the ears are being acted upon by the rolls, the reason being to insure a more certain engagement of the husks by the rolls. The pressure, however, should not be maintained throughout the travel of the ears along the rolls in order that the ears may be allowed to turn at times by the action of the rolls and thereby present unhusked sides.

In the present invention, pressure is applied to the ears of each row by independently acting, positively driven presser members. In the present case, two presser members are employed for each pair of husking rolls, one near the upper ends of the rolls and one near the down ends. The pressure is a result of the weight of the mechanism counterbalanced by a coiled spring in such a way that a variation in the degree of pressure may be secured, while by the space between the several aligned presser members, the ears are free to turn. During the passage of the ears through the husking roll compartment a tendency exists by which ears rebound or are thrown from their place in the row, sometimes assuming a cross-wise position. This generally takes place between the two presser members of a pair of rolls and means are employed to cause such ears to be restored to the correct lengthwise position before passing beyond the lower presser member. For this purpose the straightway means is associated with the lower set of presser devices.

Inasmuch as these pressure applying devices are alike in construction, but one will be described, and the same reference characters applied to all. The presser member proper is a paddle-like wheel, consisting of a disk 8 attached to one end of a short shaft 9, on the shaft side of which disk a plurality of equally-spaced, radially disposed paddles 10 are secured in any suitable manner. Actual contact with the ears, represented by the character "E", by the paddles 10 is made on the peripheral axial edges 10'.

Each presser member is positively rotated in the approximate plane of a row of ears on the rolls thereby assisting the gravitation of ears while preventing rebound or displacement from the groove between the rolls. Each shaft 9 is rotatably mounted in the free end of an arm 11 which is loosely mounted on a shaft 12 extending across the entire group of husking rolls. In the present case the upper shaft 12 is journaled in bearings 13 fixed in standards 14 attached to the upper rails 15 of the main frame 7. On the end of each shaft 9 opposite the end on which the presser member is secured is a sprocket 16 over which a chain 17 is passed to a sprocket 18 on the shaft 12. Rotation of the shaft 12 therefore causes the paddle wheel to revolve, the direction being indicated by the arrow 19, Figs. 1, 3 and 6. The pivotal connection of the arm 11 with the shaft 12 is for the purpose of permitting the presser member to rise or fall as large or small diameter ears are encountered, at the same time, maintaining rotation of the presser member.

The weight of each presser device is more than is at times needed for efficient contact, and to reduce the pressure, part of the weight is counterbalanced. At 20 is seen a helical spring placed loosely on a tubular member 21, through the bore of which is passed a rod 22. One end of this rod is hooked into an upstanding arm 23 integrally attached to the pivotal end of the arm 11, and at the opposite end, which is provided for a distance with a screw thread, is a nut 24 and washer 25. The rods 21 also pass through openings in a transversely extending bar 26 attached to upwardly extending portions 14' of the standards 14 in the case of the upper pressure devices, and through brackets 26' in the case of the lower pressure devices, and the tubular members 21 and springs 20 bear against this bar and brackets. A nut 24 is screwed on each rod sufficiently far to provide the proper clearance between the paddle edges 10' and roll 1, this clearance space being less than the diameter of an ear of corn, the nut drawing the rod 22 through the tube. The pressure applying devices, therefore, are each adjustably supported by the bar 26 and brackets 26', with the tube 21 interposed between the same and the nut and washer 24 and 25. Each spring 20 is somewhat greater in length than the tube 21 and therefore tends to lift its pressure device. With the adjustment as noted the spring is not sufficiently compressed to exert a force of this degree, and the mechanism is supported as aforedescribed. So soon, however, as an ear is encountered by one of the paddle edges 10' the entire pressure device is lifted, its spring exerting whatever force it is capable of to aid in counterbalancing the weight of the device, so that the device will apply only that pressure necessary to accomplish the desired result.

By this arrangement light momentary pressures are imposed on each ear.

To each of the upper pressure devices the ears come in rows arranged by the husking roll chute (not shown). After passing downwardly from an upper pressure device the speed with which the husking operation is carried out may cause the ears to rebound or be displaced by the action of the husking rolls. To re-arrange the displaced ears, a pair of straightening devices are employed, a description of which follows:

To the free end of each of two of the lower arms 11 is an integrally attached lug 28 in which is a pin 29, pivoted on which is a finger 30. The finger is given oscillatory movement much more sharply in the direction of the arrow 31, Fig. 3, than on the return movement and due to its position, i. e., in a forwardly and approximately central location between a pair of pressure devices, a displaced ear in a cross-wise position is struck by the finger when the finger moves upwardly. The upward or striking movement of the finger is positively operated, there being a double armed cam member 32 having projecting pins 33, fixed on the lower shaft 12 which make contact with one arm 35 of a bell-crank 36, the opposite arm 35' of which is pivotally connected at one end of a connecting bar 37. The bar 37 is pivotally attached to the upper end of an integrally attached lug 38 on the finger 30. As the lower shaft 12 revolves, contact of the pins 33 with the arm 35 of the bell-crank causes the finger 30 to move in an upward direction. The return movement is brought about by means of a spring 39, one end of which is hooked in an opening in the bar 37, while the opposite end is hooked in an opening in a portion of the lug 38. The return movement to the position occupied by the finger in Fig. 1 is made with sufficient speed to permit the finger to ordinarily arrive at this position in advance of any ears of corn that may tend to find lodgement between the finger and pressure device, but in the event that such a thing should happen, damage to the parts is prevented since this movement is accomplished by the spring action. In the event a displaced ear is engaged by a paddle of one of the pairs of pressure devices before which the finger is placed, the upward striking action of the finger causes the free end of this ear to swing to a position in better alignment with one of the pairs of rolls, the pressure device maintaining its engagement with the ear during this time.

The shafts 12 are driven from any suitable source of power applied to a shaft 40 which has a sprocket wheel 41. A sprocket chain passes over this sprocket wheel and also over a larger sprocket wheel 42 on the lower shaft 12 to rotate that shaft. Another sprocket chain 43 passing over a sprocket wheel 44 on the lower shaft 12 and a similar sprocket wheel 45 on the upper shaft 12 serves to drive the latter shaft at the same speed as the lower shaft.

In operation, the peripheral edges of the paddles make contact with the upper surface of an ear, and apply pressure to the ears and cause the ears to be moved downwardly along the inclined upper roll surfaces.

The pressure at no time is great, being only sufficient to insure that the husks are engaged.

In Fig. 5 is shown a modified form of presser member which includes an endless sprocket chain 46 provided with a series of fingers 47 and which passes about a sprocket wheel 48 on the shaft 12' and also about a sprocket wheel 49 on the free end of the supporting arm 11', this arm being pivotally mounted upon the shaft 12'. The shaft 12' is driven from the shaft 40' through the sprocket 50 on said shaft, chain 51 and sprocket 52 connected with shaft 12'. The same means for counterbalancing this presser device is employed, the hub of the arm 11' having a finger 23' to which is pivotally attached a rod 22' which is passed loosely through a bracket 26'' and is provided with a tubular member 21' about which is placed a helical spring 20', the spring being interposed between the bracket 26' and a nut 24' on the end of the rod.

In Figs. 6, 7 and 8 there is illustrated means for holding the presser wheels in inoperative position when desired, the means being illustrated in connection with the presser wheel which is arranged above the upper ends of the husking rolls in Fig. 1, although it will be understood that the same means may be applied with the other presser wheel shown in that figure, as well as the one illustrated in Fig. 5. There is loosely mounted upon the rods 22 an angle bar 53, the forward ends of the springs 20 in this case bearing upon this angle bar instead of upon the frame member 26. Rotatably mounted upon bolts 54 carried by the horizontal leg of the frame member 26 is a pair of hubs 55 each having an arm 56 and a cam finger 57. The two arms 56 are pivotally connected to each other by a rod 58 and one end of this rod is pivotally connected to the lower end of a lever 59 by a link 60. The lever is pivoted to the vertical leg of the frame member 26 and has a detent 61 normally urged into engagement with the toothed rack 62 by a spring 63 to hold the lever in different positions of adjustment. The cam fingers 57 project through slotted openings 64 in the vertical leg of the frame member 26. When it is desired to raise and hold the presser wheels in inoperative position, the lever is manipulated to cause the cam fingers 57 to engage the bar 53 and move said bar away from the frame 26 which causes the presser wheels to be lifted to any desired degree, the wheels being held in lifted position by the engagement of the detent with the rack 62.

Having thus described my invention, I claim:

1. In a corn husking mechanism, a pair of husking rolls, an ear presser member mounted above said rolls, a pivoted finger in advance of said presser member with one end thereof normally in the path of ears traveling cross-wise down said rolls, cam operated means for periodically raising that end of the finger, and a spring for returning the finger to normal position.

2. In a corn husking mechanism, a pair of husking rolls, an ear presser member mounted above said rolls, a pivoted finger in advance of said presser member with one end thereof normally in the path of ears traveling cross-wise down said husking rolls, a rotary projection, a bell crank lever having one arm thereof in the path of said rotary projection, a link pivotally connecting the other arm of said bell crank lever with the opposite end of said finger, and a coil spring connecting said link with said last mentioned end of the finger.

3. In a corn husking mechanism, a pair of husking rolls, a pivoted arm above said rolls, a rotary presser member mounted on the free end of said arm, a pivoted finger also mounted on the free end of said arm in advance of said presser member with one end thereof normally in the path of ears traveling crosswise down said husking rolls, means for periodically raising that end of the finger to straighten said ears with relation to the rolls, and a spring for returning said finger to normal position.

4. In a corn husking mechanism, two pairs of husking rolls, a pivoted arm above each pair of husking rolls, a rotary presser member mounted upon the free end of each of said arms, a pivoted finger mounted upon the free end of one of said arms with one end thereof normally in the path of ears traveling crosswise down both pairs of husking rolls, and means for periodically raising that end of said finger.

5. In a corn husking mechanism, a plurality of husking rolls, a plurality of presser devices pivotally mounted above said rolls and movable toward said rolls, each device including a driven member, means for driving said member, means for counterbalancing each member consisting of a rod connected therewith, a stationary part, and a spring interposed between said stationary part and an abutment on the end of said rod, and means for simultaneously raising all of said presser devices consisting of a bar common to all of said rods and loosely mounted thereon, cam fingers carried by said stationary part, a lever for operating said cam fingers, and means for holding said lever in different positions of adjustment.

HENRY SYNCK.